US010140518B1

(12) United States Patent
Williams et al.

(10) Patent No.: US 10,140,518 B1
(45) Date of Patent: Nov. 27, 2018

(54) CONTENT INFORMATION AUDITING SERVICE

(71) Applicant: IMDb.com, Inc., Seattle, WA (US)

(72) Inventors: Richard David Williams, Monmouth (GB); Jordan Maureen Hay, Seattle, WA (US); Adil Mohammad Sardar, Seattle, WA (US); Michael John Wyatt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 14/971,537

(22) Filed: Dec. 16, 2015

(51) Int. Cl.
*G06K 9/34* (2006.01)
*G06K 9/00* (2006.01)
*G06K 9/18* (2006.01)
*G06F 17/30* (2006.01)

(52) U.S. Cl.
CPC ... *G06K 9/00744* (2013.01); *G06F 17/30796* (2013.01); *G06K 9/00758* (2013.01); *G06K 9/18* (2013.01); *G06K 9/344* (2013.01); *G06K 2209/01* (2013.01)

(58) Field of Classification Search
CPC .. G06K 9/00744; G06K 9/18; G06K 9/00758; G06K 9/344; G06K 2209/01; G06F 17/30796
USPC .......................... 382/174, 177–179, 182–187
See application file for complete search history.

(56) References Cited

U.S. PATENT DOCUMENTS

| | | | | |
|---|---|---|---|---|
| 8,340,498 B1* | 12/2012 | Gill | ....................... | G11B 27/105 386/241 |
| 8,392,336 B1* | 3/2013 | Syrett | ................ | G06Q 30/0201 705/1.1 |
| 2007/0253678 A1* | 11/2007 | Sarukkai | ........... | G06F 17/30787 386/241 |
| 2010/0287486 A1* | 11/2010 | Coddington | .......... | G06F 3/0236 715/769 |
| 2012/0278263 A1* | 11/2012 | Borthwick | ........ | G06F 17/30303 706/12 |
| 2013/0294642 A1* | 11/2013 | Wang | ................ | G06F 17/30855 382/103 |

OTHER PUBLICATIONS

Whatismymovie.com. "About our technology." https://web.archive.org/web/20151006080251/http://www.whatismymovie.com:80/technology (Oct. 6, 2015).*

* cited by examiner

*Primary Examiner* — Andrew Moyer
(74) *Attorney, Agent, or Firm* — Kilpatrick Townsend & Stockton LLP

(57) ABSTRACT

Systems and methods are provided for auditing content information for a media work. In embodiments, content information for a plurality of media works that identifies entities associated with each media work may be maintained. In an embodiment, a request to identify a particular media work may be received. One or more words included in a segment of the particular media work may be identified where the segment is configured to be presented. In accordance with at least one embodiment, the one or more identified words may be filtered based on a set of rules to correct errors. An identity of the particular media work may be determined based at least in part on the filtered one or more words and the content information for the plurality of media works.

16 Claims, 8 Drawing Sheets

CONTENT INFORMATION AUDITING SERVICE

BACKGROUND

Online media content providers have provided access to a plurality of media works such as songs, videos, movies, TV-shows, and streaming media. Currently, users may utilize search engines or other services to seek information about a particular media work, such as identifying a particular actor in a TV-show. However, the amount of information for media works is expansive including hundreds of cast and crew for one media work. Maintaining such a large amount of data and accurately updating is a difficult task that is prone to errors. Further, such information may be derived from certain segments of the content itself providing more difficulty in acquiring the identifying information for a media work. Thus, there are difficulties with auditing and/or accurately identifying such information for media works.

BRIEF DESCRIPTION OF THE DRAWINGS

Various embodiments in accordance with the present disclosure will be described with reference to the drawings, in which.

DETAILED DESCRIPTION

Figure 1:
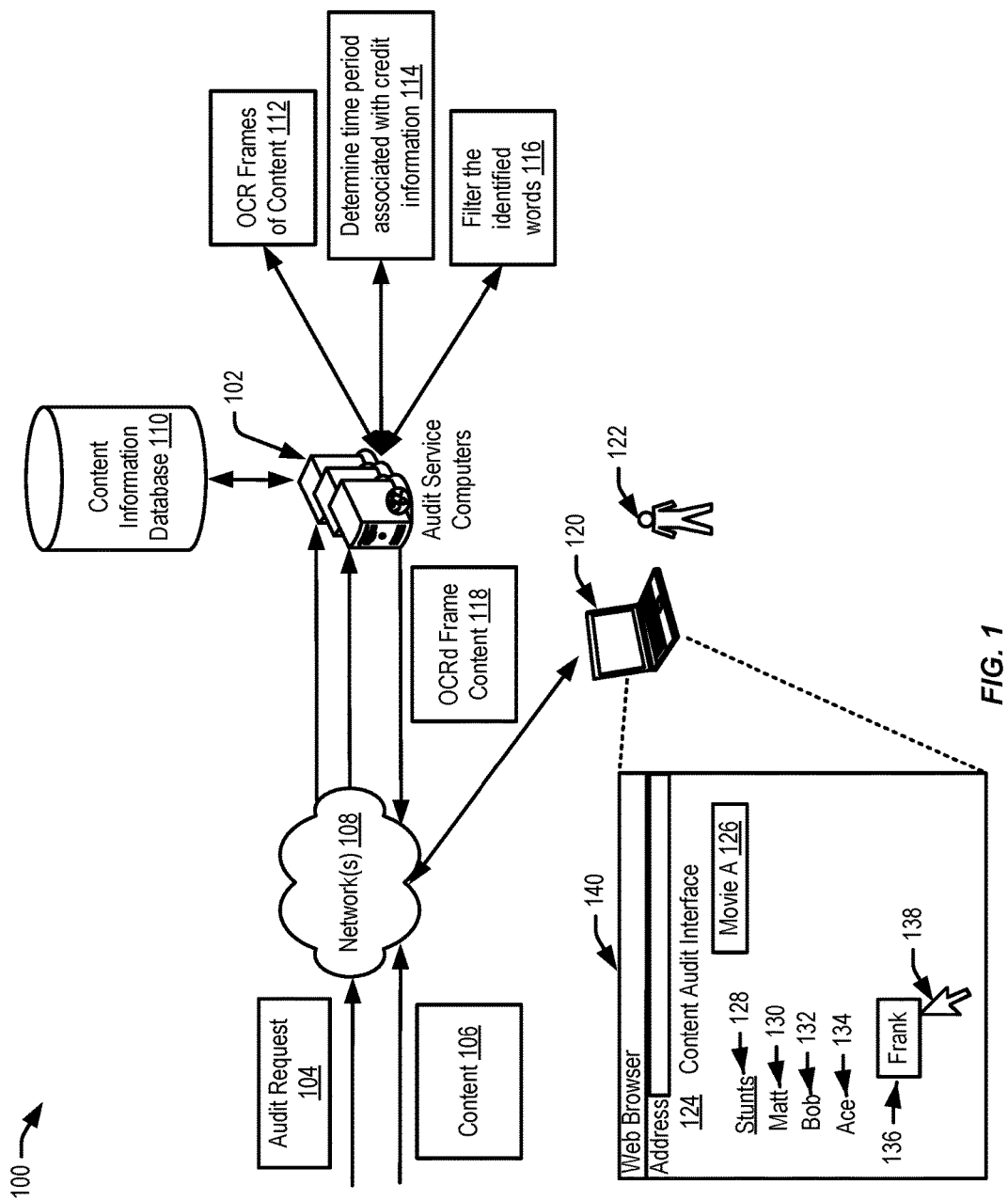
FIG. 1 illustrates an example workflow for providing a content information auditing feature described herein, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include systems and methods for providing a content information auditing service that verifies and generates accurate information for a media work by obtaining words included in the media work and leveraging content information for a plurality of media works that identifies cast and crew for each media work. In accordance with at least one embodiment, the content information auditing service may maintain content information that identifies cast, crew, soundtracks, trivia, or other suitable information that may be associated with a media work. In some examples, a "media work" includes any digital image, video, movie, film, TV-show, animated film or TV-show, video game, or other suitable visual media. In embodiments, the content information auditing service may receive a request to identify, verify, or provide missing content information for a particular media work from an entity such as a user or an entity associated with an online content media provider. The content information auditing service may utilize optical character recognition (OCR) techniques to identify one or more words in a portion or segment of a media work that is associated with the presentation of credit information for the media work. Credit information may include suitable information for identifying cast, story characters, actors, crew, music, staff, and other entities or information that identifies entities that comprise a media work. In accordance with at least one embodiment, audit service computers that implement the content information auditing service features described herein, may perform or utilize OCR software on each frame of a portion or segment of a media work to identify the one or more words that are configured to be presented in the segment or portion of the media work.

In accordance with at least one embodiment, the content information auditing service may perform filtering or correction of errors of the one or more words that are identified in the segment for the media work in question. The filtering or correction of errors may be based at least in part on a set or rules that are generated and maintained by the audit service computers. The set of rules may comprise rules for removing false positives or correcting an error of an identification of a particular term or word by utilizing a statistical operation associated with a count of a word to a new occurrence of a word. For example, a series of frames for a movie may identify that the word "Tom" has appeared in the frames an average of 12 times while a newly processed frame may indicate that the word "Tim" was identified in the frame. As "Tim" only has one occurrence in subsequent frames for a similar coordinate position in the frame, the auditing service computers may mark "Tim" as an outlier or false positive. In embodiments, a statistical operation associated with a count of a work may include an average, a median, a geometric mean, a mode, or a percentage. In some embodiments, the set of rules may comprise rules based on a physical location of a word in a series of frames using coordinates for the word generated by the OCR process, or based on how many words appear between a first occurrence of a particular word and a second occurrence of a particular word in the same frame. For example, a series of frames may indicate that the word "John" and "Key Grip" both appear in the same frame but there are other words which appear between the two word groups, then the audit service computers may not form an association between the two words. The amount of words between the two word groups may be compared to a threshold maintained by the audit service computers. In embodiments, once the identified words have been filtered, an identity of the media work may be determined based on a comparison of the filtered words to the content information maintained for a plurality of media works. For example, a particular movie may be identified ("Mission Impossible") based on the one or more words including a particular actors name ("Tom Cruise") and a particular story character's name ("Ethan Hunt"). In some examples, a request may be received by the audit service computers to determine whether a media work is the same as another media work. The filtered words can be compared to the content information for the other media work to determine if the two media works are the same or part of the same series (such as multiple episodes of a TV series or show). For example, the filtered words may identify several story characters of a first media work ("Ted," "Lily," and "Robin") that are matches for several story characters of a second media work ("Ted," "Lily," and "Robin"), which can be utilized by the auditing service computers to determine a match and identify the identity of the first media work.

In accordance with at least one embodiment, the content information auditing service features may complete or provide missing content information for a media work. For example, by comparing the words identified and filtered from the segment of the media work to the content information for a plurality of media works, missing or incomplete information may be generated for the media work in question. In embodiments, entities may be assigned to particular classifications based on the words identified by the audit service computers by leveraging the content information for the media work after the media work has been identified. For example, one of the identified words may be a cast members name but the content information for the particular media work may be missing the story character played by the cast member. This information can be identified by the auditing service computers utilizing a mapping of the known cast member to story character association information included in the content information to update the content information for the particular media work and therefore provide a more complete knowledge base for the media work.

In accordance with at least one embodiment, the content information auditing service features include providing, by the audit service computers, a user interface configured to be presented via a user computing device (user device) of a user or other requesting entity as described herein. The user interface provided by the audit service computers may be configured to present an identification of one or more words that are not included in the content information for the particular media work or in the maintained content information. A user may interact with the user interface to provide user input that can be interpreted and processed by the audit service computers to update the content information for the particular media work. For example, a user may interact with the user interface to assign a word, full name, or the like that is missing from the content information for the media work (such as "Tom Cruise") to a story character for the media work (such as "Ethan Hunt").

In a non-limiting example, the audit service computers may receive a request to audit information for a particular movie from an online media content provider. The audit service computers may maintain content information (list of cast and crew) for a plurality of movies. In embodiments, the audit service computer may identify a segment or portion of the movie to begin OCR processing of each frame of the particular movie based on metadata associated with the particular movie. For example, the metadata may identify a set of frames that include the credits (cast and crew information). The words identified by the OCR processing may be filtered by the audit service computer using a set of rules that corrects errors of words included in the segment of the particular movie. The particular movie may be identified as Movie A based on a comparison of the filtered words of the particular movie and the list of cast and screw maintained for Movie A. For example, Movie A's filtered words may have included multiple actors and story characters that are associated with the list of cast and crew for Movie A. In some examples, a user interface may be provided to a user associated with the online media content provider that is configured to present the identity of the particular movie as Movie A and any words that are not included in the maintained content information. The user may interact with the user interface to provide additional input that can be utilized by the audit service computers to update the content information for the plurality of movies and the content information for the particular movie. For example, the user may interact with the user interface to assign several crew members to the special effects team for Movie A.

FIG. 1 illustrates an example workflow 100 for providing a content information auditing feature described herein, in accordance with at least one embodiment. The workflow 100 depicted in FIG. 1 includes audit service computers 102 receiving an audit request 104 for content 106 via network 108. In embodiments, the audit request 104 may include a request to determine the identity of the content 106 (i.e., determine a title or inclusion in a syndicated series), verify content information for the content (i.e., determine that cast and crew are properly credited with appropriate roles for the content), or provide missing content information for the content 106 (provide information for correct associations between cast, crew, and other entities for the content). In embodiments, the content 106 can include a media work such as a video game, movie, TV show, digital video of a live performance, or other suitable media works as described herein. In accordance with at least one embodiment, the audit service computers 102 may maintain content information for a plurality of media works in a content information database 110.

In an embodiment, the content information may identify cast, crew, soundtracks or other audio related information for a plurality of media works provided by one or more online content providers. The audit service computers 102 may determine a segment or portion of the content 106 to perform optical character recognition on based at least in part on metadata associated with the content 106. In some embodiments, a requesting entity may provide a time period or window that identifies the segment or portion that corresponds to credit information for the content 106 with the audit request 104. In accordance with at least one embodiment, the audit service computers 102 may OCR frames 112 of the portion of the content 106 based at least in part on the determination of the time period 114 associated with the credit information for the content 106. In embodiments, the audit service computers 102 may perform OCR processing of each frame 112 of the portion of the content 106 to identify one or more words included in the portion of the content 106. The audit service computer 102 may subsequently filter the identified words 116 in the portion of the content 106 according to a set of rules that are generated and maintained by the audit service computers 102. The set of rules may comprise one or more rules for removing false positives of identifications of particular terms in the OCR'd frames (OCR'd frames are frames that include text, the characters of which have been recognized by an OCR or similar technique) of content 112 or for correcting errors of the words included in the OCR'd frames of content 112. For example, a rule may indicate utilizing a count of occurrences of a term to a new occurrence for that term to determine that the term was incorrectly identified by the OCR process. In some examples, the count of an occurrence of a term in a frame may be compared to a threshold for the content 106 to determine whether the term is an outlier or a new term all together. The audit service computers 102 may identify the identity of the content 106 based on a comparison of the filtered words 116 for the content 106 and the content information for the plurality of media works maintained in the content information database 110.

In accordance with at least one embodiment, the audit service computers may provide the OCR'd frame content 118 to a user device 120 for presentation to a user 122 via a content audit interface 124. In an embodiment, the OCR'd frame content 118 may be utilized by the audit service computers 102 to generate a content audit interface 124. In embodiments, the content audit interface 124 may include the identity 126 of the content 106 ("Movie A"), an identification of a classification of entities 128 ("Stunts"), several names including cast and crew 130-134, and any missing or different terms 136 included in the OCR'd Frame Content 118 for the content 106. The missing or different terms 136 may be tagged, highlighted, or otherwise marked as distinct from the other terms (126-134) in the content audit interface 124 for easier identification by the user 122. In embodiments, the user 122 can provide input via the user device 120 and content audit interface 124 to provide the missing or incorrect information for the term 136 by utilizing input/output devices 138 such as a mouse or keyboard of the user device 120. In accordance with at least one embodiment, the input provided by the user 122 for the missing or incorrect term 136 may be transmitted to the audit service computers 102 for updating the content information for the plurality of media works and/or for updating the content information for the content 106. In embodiments, the content audit interface 124 may be presented to the user 122 via the user device 120 through a web browser 140. In some embodiments, the content audit interface 124 may be presented to the user 122 via a native application of the user device 120 that is provided by the audit service computers 102.

Figure 2:
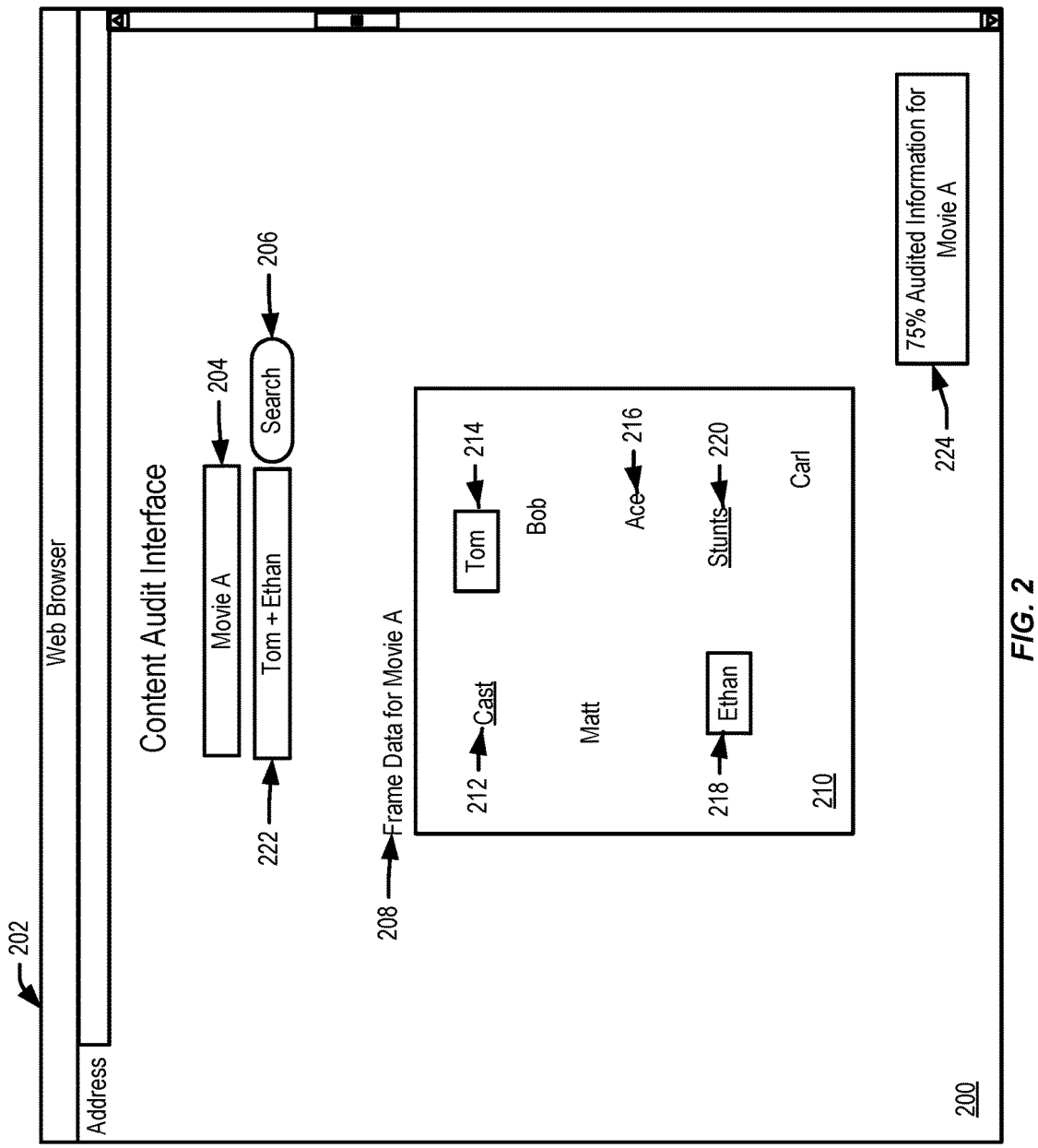
FIG. 2 illustrates an example user interface for content information auditing features described herein, in accordance with at least one embodiment.

FIG. 2 illustrates an example user interface for content information auditing features described herein, in accordance with at least one embodiment. The user interface 200 depicted in FIG. 2 may be an example of content audit interface 124 from FIG. 1 and may be presented to a user via a web browser 202. The content audit interface 200 may include an identity of a media work 204 ("Movie A"), and search functionality 206 for searching for a particular term or word included in the one or more words identified through the content information auditing features described herein. The content audit interface 200 may include text 208 describing a frame data for the media work 204 that can in some embodiments describe a particular frame or count of the frame currently being presented of a total number of frames that were processed with OCR by the audit service computers. In embodiments, the content audit interface 200 may present a user interface element 210 that displays one or more words 212-220 that were identified via the OCR and filtering process described herein. The content audit interface 200 may be configured to enable a user to interact with the one or more words 212-220 to associate a cast or crew with a story character or support role for the media work 204.

In accordance with at least one embodiment, a user may utilize the search functionality 206 to search for particular terms in the presented frame 210. In response to providing input for the search 222, the content audit interface 200 may update the presented frame 210 to tag, highlight, or otherwise mark the words 214 ("Tom") and 218 ("Ethan") to reflect the presence of the words in the presented frame 210 for the media work 204. Thus, the content audit interface 200 may be utilized by users to verify content information associated with a particular media work such as media work 204 by searching via search functionality 206 for the presence of particular terms (214 and 218) within the OCR data for the media work 204. In embodiments, the user can search 222 for the terms 214 and 218 in each particular frame of the media work 204. In still other embodiments, the content audit interface 200 may be configured to return results that include particular frame identifications that contain the searched for terms 222.

In some embodiments, the OCR and filter processing performed by the audit service computers provides a position in X and Y coordinates of the term in each frame. In embodiments, a user may interact with the content audit interface 200 to view one or more of the frame data 208 and 210 of the media work 204. Each frame displayed may include a tagging or marking of words that are potentially incorrect or missing from the maintained content information for the plurality of media works as described herein. In an embodiment, a user may utilize input/output devices such as a touch screen, digital pen, mouse, or keyboard to associate words (such as 216) to classifications or roles (such as 220) for the media work 204. The input of user provided association may be transmitted to the audit service computers for updating the content information for the media work 204 and/or for the plurality of media works maintained by the audit service computers. In accordance with at least one embodiment, the content audit interface 200 may provide information regarding accuracy of the content information 224 for the media work 204 based on a comparison of the identified words, via the OCR and filter processing, to the maintained content information for the media work 204 determined by the audit service computers. For example, the accuracy of the content information 224 depicted for media work 204 indicates that 75 percent of the words identified and filtered by the content information auditing service features are included in the library of content information for media work 204. This metric (224) provides useful information to users and administrators of the content information auditing service by identifying media works that require more attention to obtain user input to identify the missing or incorrect words for the media work 204.

Figure 3:
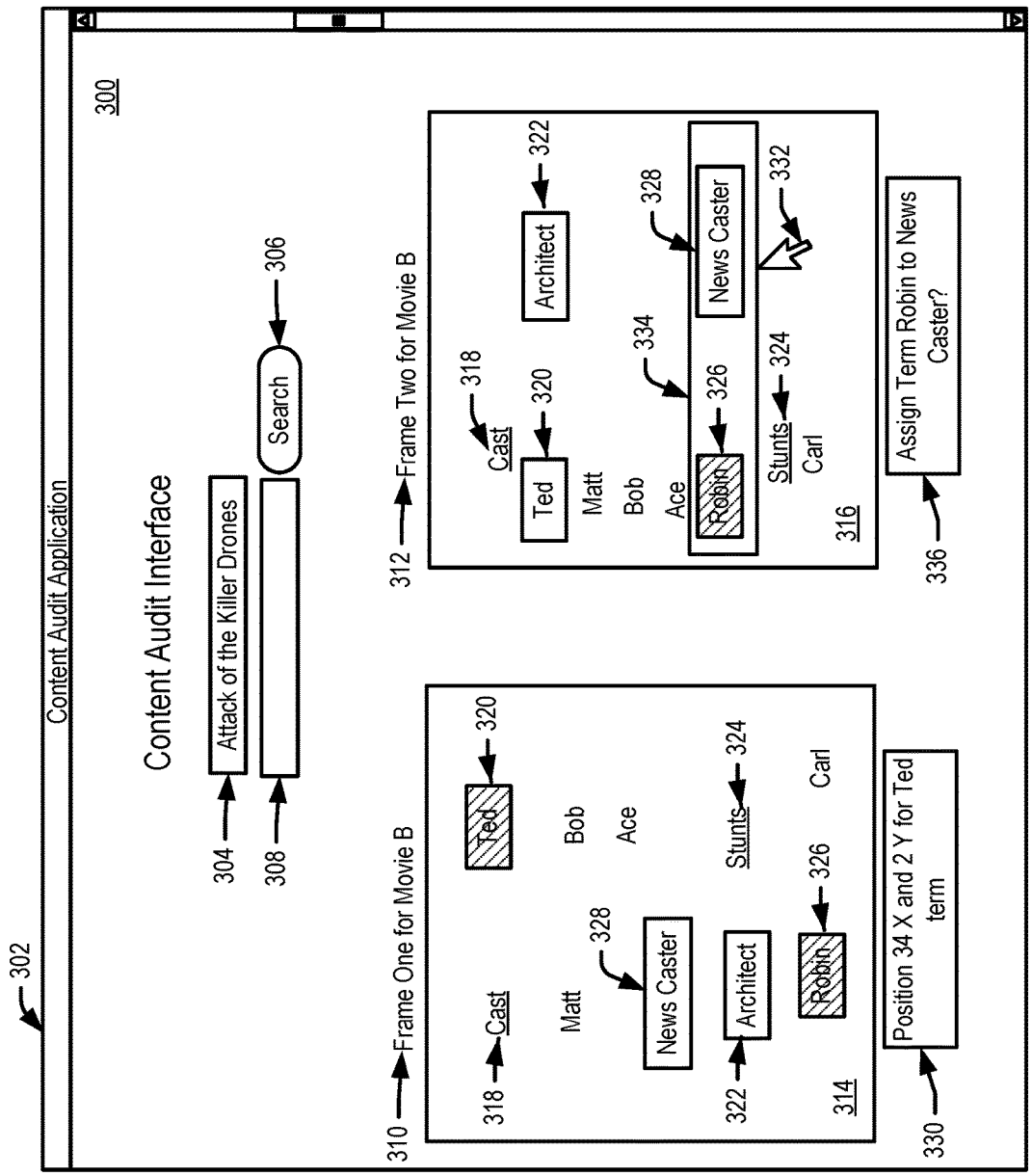
FIG. 3 illustrates an example user interface for content information auditing features described herein, in accordance with at least one embodiment.

FIG. 3 illustrates an example user interface for content information auditing features described herein, in accordance with at least one embodiment. The user interface 300 depicted in FIG. 3 may be an example of content audit interface 124 from FIG. 1 and may be presented to a user via a native application such as content audit application 302. The content audit interface 300 may include an identity of a media work 304 ("Attack of the Killer Drones"), and search functionality 306 that includes a field 308 for searching for a particular term or word included in the one or more words identified through the content information auditing features described herein. The content audit interface 300 may include frame data 310 and 312 for a first and second frame that was OCR'd by the audit service computers as described herein. Each frame data 310 may include interactable interface elements 314 and 316 that include one or more words 320-328 that were identified and filtered by the OCR process of the content information auditing service feature. The one or more words 320-328 may include terms for actors, cast, roles, and crew of media work 304. For example interface element 314 of frame data 310 includes actors "Ted" 320 and "Robin" 326 as well as roles "Architect" 322 and "News Caster" 328. Similar to FIG. 2, the frame data 310 may highlight, tag, or mark certain words (320 and 326) as words that are missing or incorrect according to the maintained content information for the plurality of media works. In embodiments, the certain words (320 and 326) may be highlighted, tagged, or marked by the audit service computers based on a violation of a particular rule included in the set of rules maintained by the audit service computers. For example, the word "Ted" 320 and "Robin" 326 may be tagged for further correction by a user based on their position in the frame data 310 in comparison to a classification or category such as "Cast" 318.

In accordance with at least one embodiment, the content audit interface 300 may include a position element 330 that includes information about the coordinates of a particular term in the frame data 310 for a particular frame of the media work 304. For example, the position element 330 includes X and Y coordinates for the word "Ted" 320 in frame data 310. The position element 330 may update dynamically as a user interacts with each available frame for the media work 304 via the content audit interface 300 or as the user interacts with different words in the frame data 310. In accordance with at least one embodiment, the content audit interface 300 may depict the transition of the one or more words 320-328 from one frame (frame data 310) to another frame (frame data 312) via the interface element 316. As described herein, each frame of a media work may be OCR'd and filtered so that as words appear or are presented in the media work 304 their position and identity may be determined by the audit service computers. For example, the words 318-328 have moved to be associated or near a respective classification or role (320 and 324) for the media work 304 from frame data 310. In embodiments, the content audit interface 300 may be configured to receive input from a user, such as via an input/output device 332 to assign or associate 334 particular terms and verify and/or correct 336 the content information for the media work 304. For example, the user may wish to associate 334 the word "Robin" 326 with the story character role "News Caster" 328 for media work 304. In response to forming an association 334 (such as by interacting with the content audit interface 300), a confirmation of the verification 336 may be presented to the user. As a result of associating or assigning words to roles or removing words as errors in the identified and filtered words for the media work 304, the content information for the media work 304 and for the plurality of media works may be updated by the audit service computers. A term that is associated or assigned 334 may be untagged, or have the highlighted removed to indicate that the term is no longer missing and/or incorrect.

Figure 4:
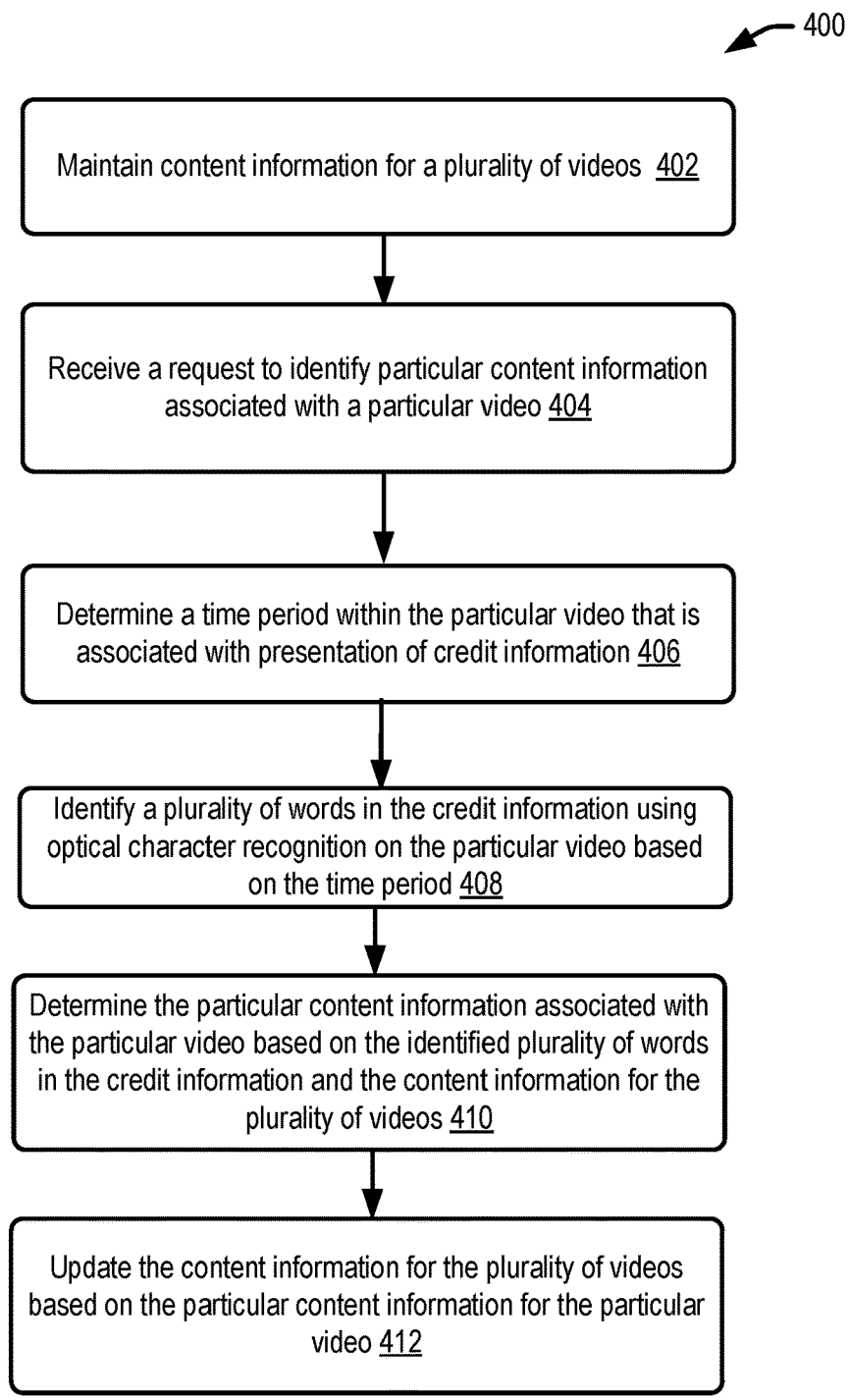
FIG. 4 illustrates an example flow diagram for a content information auditing feature described herein, in accordance with at least one embodiment.
Figure 5:
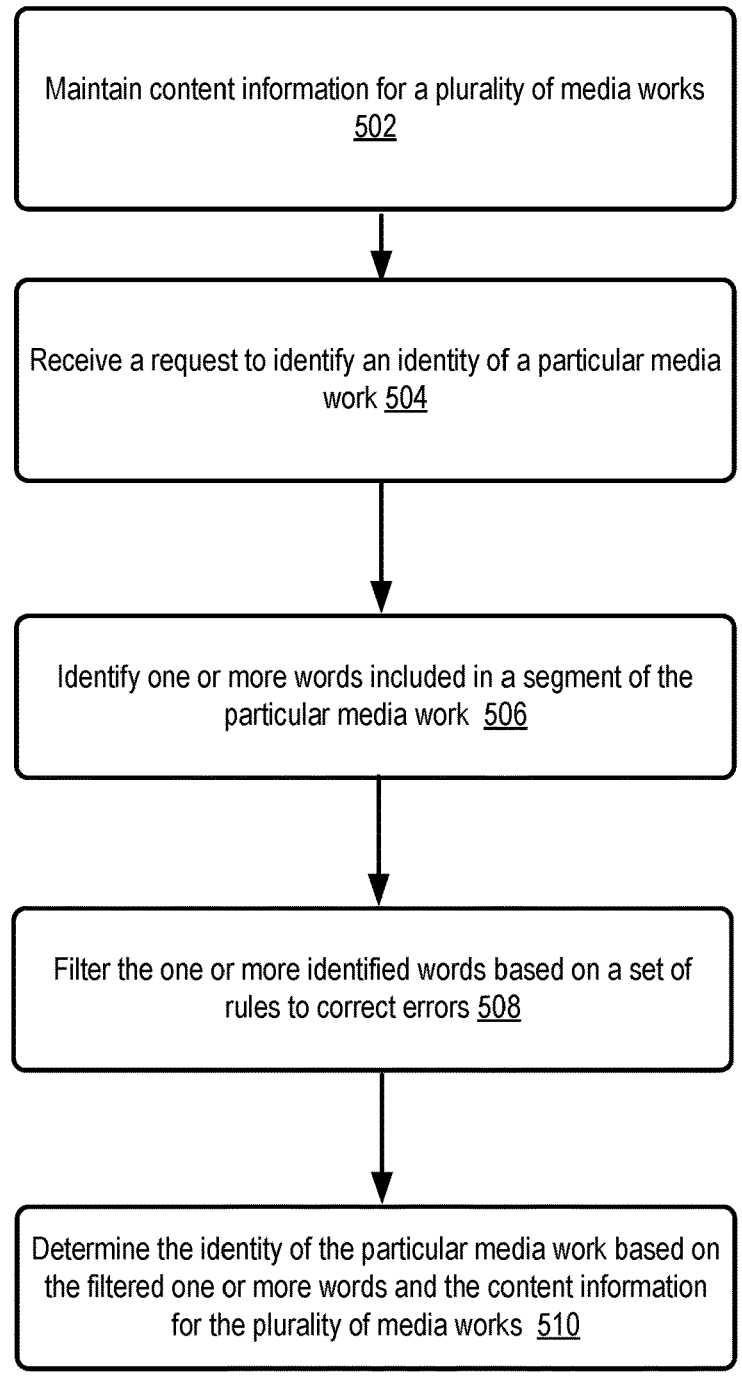
FIG. 5 illustrates an example flow diagram for a content information auditing feature described herein, in accordance with at least one embodiment.

FIGS. 4 and 5 illustrate example flow diagrams for a content curation feature described herein, in accordance with at least one embodiment. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any suitable number of the described operations can be combined in any suitable order and/or in parallel to implement the processes.

Additionally, some, any, or all of the processes (or any other suitable processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted herein, the code may be stored on a computer-readable storage medium, for example, in the form of a computer program including a plurality of instructions executable by one or more processors. The computer-readable storage medium may be non-transitory.

Figure 6:
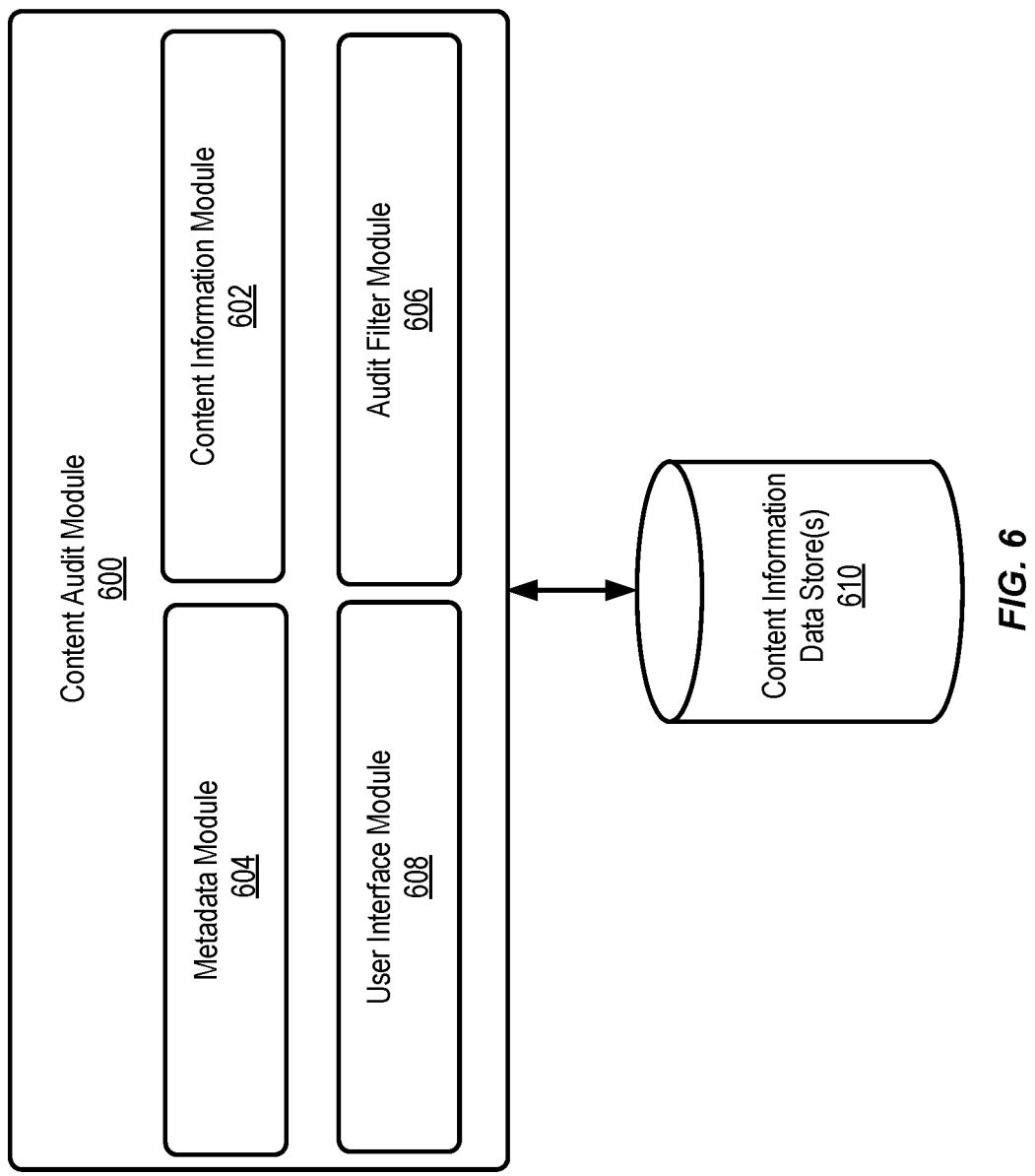
FIG. 6 illustrates a schematic diagram depicting aspects of a content audit module as described herein, in accordance with at least one embodiment.

In some examples, one or more audit service provider computers (e.g., utilizing at least one of a content audit module 600, a content information module 602, a metadata module 604, an audit filter module 606, and a user interface module 608 in communication with one or more data stores 610) shown in FIG. 6 may perform the processes 400 and 500 of FIGS. 4 and 5. In FIG. 4, the process 400 may include maintaining content information for a plurality of videos at 402. As described herein, the content information may identify at least one of the cast or crew that is associated with each video of the plurality of videos. In embodiments, the audit service computers may update the content information for the plurality of videos as more content is processed and input is provided by users. The process 400 may include receiving a request to identify particular content information associated with a particular video at 404. In accordance with at least one embodiment, the request may be from a computing device of an online media content provider or a user device of a user. The request may include the particular video. In embodiments, the process 400 may include determining a time period within the particular video that is associated with presentation of credit information at 406. The time period may be determined based at least in part on metadata that is associated with the particular video that identifies when credit information begins in the particular video. The time period may be associated with the presentation of the credit information for the particular video. In some embodiments, the time period may be provided by the requesting entity.

In accordance with at least one embodiment, the process 400 may include identifying a plurality of characters in the credit information using optical character recognition on the particular video based on the time period at 408. In embodiments, optical character recognition may be performed on each frame of the particular video starting at the time period and ending at the complete run time for the particular video. The characters may be arranged by the audit service computers or OCR software to form a plurality of words. In an embodiment, the process 400 may include determining the particular content information associated with the particular video based on the identified plurality of characters in the credit information and the content information for the plurality of movies at 410. As described herein, a comparison between the terms identified by the OCR of the credit information of the particular video and the words or terms for a plurality of videos may be utilized to determine the particular content information associated with the particular video. For example, the audit service computers may perform a mapping between the terms and compare the matched words to a threshold to determine that the words are correct or exist in an appropriate location within each frame when compared to a matching frame of at least one video of the plurality of videos. Further, an identity of the particular video may be determined based on the same comparison of terms between two videos and a threshold to identify a certain number of matching words between the two videos and an identification of the identity of the particular video in question. In embodiments, the process 400 may conclude at 412 by updating the content information for the plurality of videos based on the particular content information for the particular video. Further updates to the content information may occur based on user provided input utilizing the content audit interfaces described herein.

In accordance with at least one embodiment, the process 500 may include maintaining content information for a plurality of media works at 502. The content information may identify entities and associated roles for each media work of the plurality of media works. In embodiments, the process 500 may include receiving a request to identify an identity of a particular media work at 504. The identity of the particular media work may include using particular content information that is associated with the particular media work. The process 500 may include identifying one or more words included in a segment of the particular media work at 506. In accordance with at least one embodiment, the segment of the particular media work may be configured to be presented in the particular media work. The segment may correspond to the credit section or credit information of the particular media work. In some embodiments, the one or more words may be identified utilizing optical character recognition on the segment of the particular media work. The process 500 may include filtering the one or more identified words based at least in part on a set of rules to correct errors at 508. In embodiments, the set of rules may identify and remove false positives of words that were identified in a first pass OCR scenario. The set of rules may utilize a count of each term in the complete OCR data of the particular media work to determine an average of each term. The average count of each term may be compared to a new occurrence and location of a term to identify an outlier, false positive, or incorrect identification by the OCR process. The process 500 may conclude at 510 by determining the identity of the particular media work based on the filtered one or more words and the content information for the plurality of media works. The identity of the particular media work may be determined based on a comparison of filtered one or more words of the particular media work and a plurality of words included in the content information for the plurality of media works and a threshold. For example, a match of so many words between any two particular media works may need to exceed a particular threshold that is maintained by the audit service computers to determine the identity of the particular media work.

FIG. 6 illustrates a schematic diagram depicting aspects of a content audit module as described herein, in accordance with at least one embodiment. In accordance with at least one embodiment, the content audit module 600 may include a content information module 602, a metadata module 604, an audit filter module 606, and a user interface module 608 in communication with a content information data store 610. The modules included within and including content audit module 600 may be software modules, hardware modules, or a suitable combination thereof. If the modules are software modules, the modules can be embodied on a non-transitory computer readable medium and processed by a processor in any of the computer systems described herein. It should be noted that the described processes and architectures described herein can be performed either in real-time or in an asynchronous mode prior to user interaction. The modules may be configured in the manner suggested in FIG. 6 or may exist as separate modules.

In accordance with at least one embodiment, the content audit module 600 may be configured to perform the optical character recognition on frames of segment and/or portion of a media work that corresponds to credit information for the media work. In embodiments, the content audit module may be configured to identify and determine the coordinates of one or more words that are identified in each frame during the OCR process. The coordinates may be utilized by the audit filter module 606 to filter particular terms or words as described herein. In accordance with at least one embodiment, the content audit module 600 may be configured to maintain one or more thresholds for determining the identity of a particular media work or for filtering one or more words according to an average count of occurrences of the word in the frames for the media work as described herein.

In accordance with at least one embodiment, the content information module 602 may be configured to maintain and update the content information for a plurality of media works for the content information auditing service. In embodiments, the content information module 602 may update the content information for the plurality of media works by updating connections, recommendations, and related media works based on the input provided by a user or based on an identification of terms or a particular media work in response to a request from an entity. As described herein, the content information module 602 may update the particular content information for a particular media work in response to a request to verify the content information for the particular media work or a request to determine the identity of the particular media work.

In accordance with at least one embodiment, the metadata module 604 may be configured to identify or determine a time period in a media work that marks the beginning of credit information for the media work. In embodiments, the identification or determine of the time period may be based at least in part on the metadata module 604 processing metadata associated with a particular media work. In embodiments where a user provides the time period for identifying the credit information for a particular media work, the metadata module 604 may update the time period information for the particular media work.

In accordance with at least one embodiment, the audit filter module 606 may be configured to generate and maintain a set of rules for correcting errors or removing false positives that are identified during the identification of the one or more words in the OCR process by the content audit module 600. In accordance with at least one embodiment, the audit filter module 606 may be configured to determine the verification or accuracy of the maintained content information for a particular media work based on a comparison of the terms identified for the particular media work and the terms associated with the media work in the maintained content information. The accuracy information may be presented to a user via a user interface and the user interface module 608. The set of rules may comprise one or more rules for correcting errors such as coordinate position of a word to coordinate position of another word in a same frame or across multiple frames, or a count of words between two occurrences of words within the same frame, or other suitable rules for correcting errors or removing false positives described herein.

In accordance with at least one embodiment, the user interface module 608 may be configured to generate a user interface that includes frame data and identified words such as the frame data and identified words included in FIGS. 1-3. In embodiments, the user interface module 608 is configured to process input provided by a user via the user interface, such as a content audit interface. The input may be utilized, by the user interface module 608 and content information module 602 to update content information for a particular media work that is being analyzed by the audit service computers in response to a request. The user interface module 608 may be configured to update associations or assignments of words, and therefore the content information for a particular media work, based on the input provided via the user interface. In accordance with at least one embodiment, the user interface module 608 may be configured to process and return results for users utilizing the search functionality to search for a word included in the frame data for a particular media work as described in FIG. 2. The user interface module 608 may be configured to highlight, tag, or mark particular words that were identified and filtered in the frame data for a particular media work. The highlighting, tagging, or marking may be updated by the user interface module 608 based on the input provided by a user utilizing the user interface and reflected in updated content information via the content information module 602.

Figure 7:
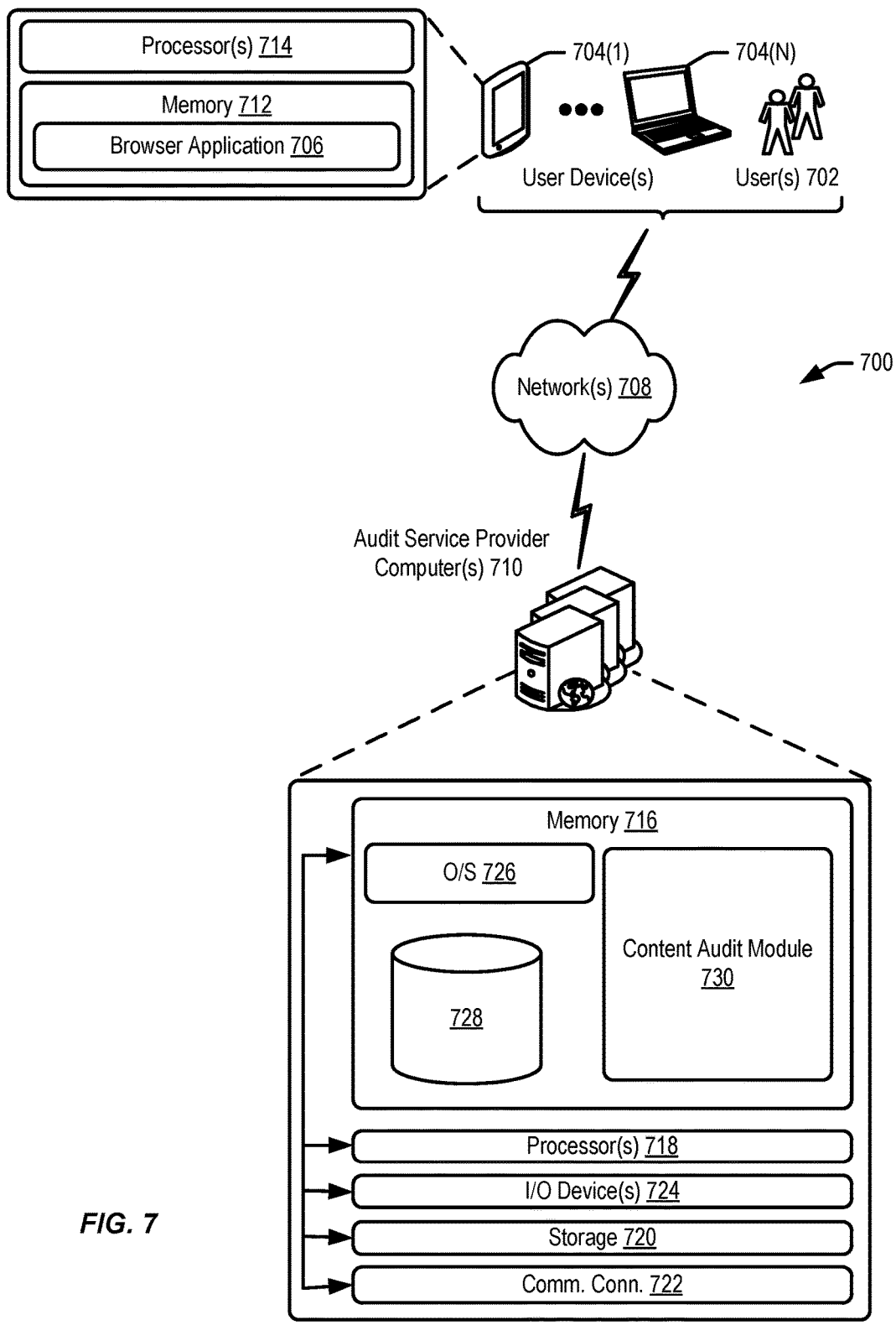
FIG. 7 illustrates an example architecture for content information auditing features described herein that includes audit service computers and user devices connected via one or more networks as described herein, in accordance with at least one embodiment.

FIG. 7 illustrates an example architecture for content information auditing features described herein that includes audit service computers and user devices connected via one or more networks as described herein, in accordance with at least one embodiment. In architecture 700, one or more users 702 (e.g., users) may utilize user computing devices 704(1)-(N) (collectively, user devices 704) to access a browser application 706 (e.g., a network document browser) or a user interface (UI) accessible through the browser application 706, via one or more networks 708 to provide input or select words for associating with information for a media work according to content information auditing features, as described herein. The "browser application" 706 can be any browser control or native application that can access and display a web page, user interface, or other information. In some aspects, the browser application 706 may display an interactive UI for interacting with identified words or characters for a media work, providing input about presented media works or identified words according to content information auditing features as described herein.

The architecture 700 may also include, one or more audit service computers 710 that may, in some examples, provide computing resources such as, but not limited to, client entities, low latency data storage, durable data storage, data access, management, virtualization, hosted computing environment or "cloud-based" solutions, electronic content performance management, etc. The one or more audit service provider computers 710 may also be operable to provide site hosting, computer application development, and/or implementation platforms, combinations of the foregoing, or the like to the one or more users 702.

In one illustrative configuration, the user computing devices 704 may include at least one memory 712 and one or more processing units or processor(s) 714. The processor(s) 714 may be implemented as appropriate in hardware, computer-executable instructions, firmware, or combinations thereof. Computer-executable instruction or firmware implementations of the processor(s) 714 may include computer-executable or machine-executable instructions written in any suitable programming language to perform the various functions described herein. The user devices 704 may also include geo-location devices (e.g., a global positioning system (GPS) device or the like) for providing and/or recording geographic location information associated with the user devices 704. The memory 712 may store program instructions that are loadable and executable on the processor(s) 714, as well as data generated during the execution of these programs. Depending on the configuration and type of user device 704, the memory 712 may be volatile (such as random access memory (RAM)) and/or non-volatile (such as read-only memory (ROM), flash memory, etc.). The user device 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 712 may include multiple different types of memory, such as static random access memory (SRAM), dynamic random access memory (DRAM), or ROM.

Turning to the components of the memory 712 in more detail, the memory 712 may include an operating system and one or more application programs or services for implementing the features disclosed herein including interacting with presented information about media works including identified words associated with a portion of a media work that have been generated and provided by the audit service provider computers 710 to the user 702 via the browser application 706, dedicated applications (e.g., smart phone applications, tablet applications, etc.), or through capabilities inherit to a device (e.g., user interfaces or touch input interfaces). Additionally, the memory 712 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 702 provided response to a security question or a geographic location obtained by the user device 704.

In some examples, the networks 708 may include any one or a combination of many different types of networks, such as cable networks, the Internet, wireless networks, cellular networks and other private and/or public networks. While the illustrated example represents the users 702 communicating with the audit service provider computers 710 over the networks 708, the described techniques may equally apply in instances where the users 702 interact with the one or more audit service provider computers 710 via the one or more user devices 704 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The browser application 706 may be capable of handling requests from many users 702 and serving, in response, various user interfaces that can be rendered at the user devices 704 such as, but not limited to, a network site or web page. The browser application 706 can interact with any type of network site that supports user interaction, including social networking sites, electronic retailers, informational sites, blog sites, search engine sites, news and entertainment sites, electronic marketplaces, content providers, and so forth. The described techniques can similarly be implemented outside of the browser application 706, such as with other applications running on the user device 704.

The one or more audit service provider computers 710 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more audit service provider computers 710 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more audit service provider computers 710 may be in communication with the user device 704 via the networks 708, or via other network connections. The one or more audit service provider computers 710 may include one or more servers, perhaps arranged in a cluster or as individual servers not associated with one another.

In one illustrative configuration, the one or more audit service provider computers 710 may include at least one memory 716 and one or more processing units or processors(s) 718. The processor(s) 718 may be implemented as appropriate in hardware, computer-executable instructions, firmware, or combinations thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more audit service provider computers 710, the memory 716 may be volatile (such as RAM) and/or non-volatile (such as ROM, flash memory, etc.). The one or more audit service provider computers 710 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more audit service provider computers 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more audit service provider computers 710. Combinations of any of the above should also be included within the scope of non-transitory computer-readable media.

The one or more audit service provider computers 710 may also contain communication connection interface(s) 722 that allow the one or more audit service provider computers 710 to communicate with a data store, another computing device or server, user terminals and/or other devices on the networks 708. The one or more audit service provider computers 710 may also include I/O device(s) 724, such as a keyboard, a mouse, a pen, a voice input device, a touch input device, a display, speakers, a printer, etc.

Turning to the contents of the memory 716 in more detail and as was described above in further detail in FIG. 6, the memory 716 may include an operating system 726, one or more data stores 728, and/or one or more application programs or services for implementing the features disclosed herein including a content audit module 730 (which may be an example of content audit module 600). In accordance with at least one embodiment, the content audit module 730 may be configured to at least maintain content information identifying entities associated with a plurality of media works, receive and process requests to identify particular media works or information associated with the media work, perform optical character recognition on media works to identify characters or words associated with each frame of a portion of a media work, and update the content information for a particular media work and the plurality of media works based on filtering the identified characters or words according to a set of rules, as described herein.

Figure 8:
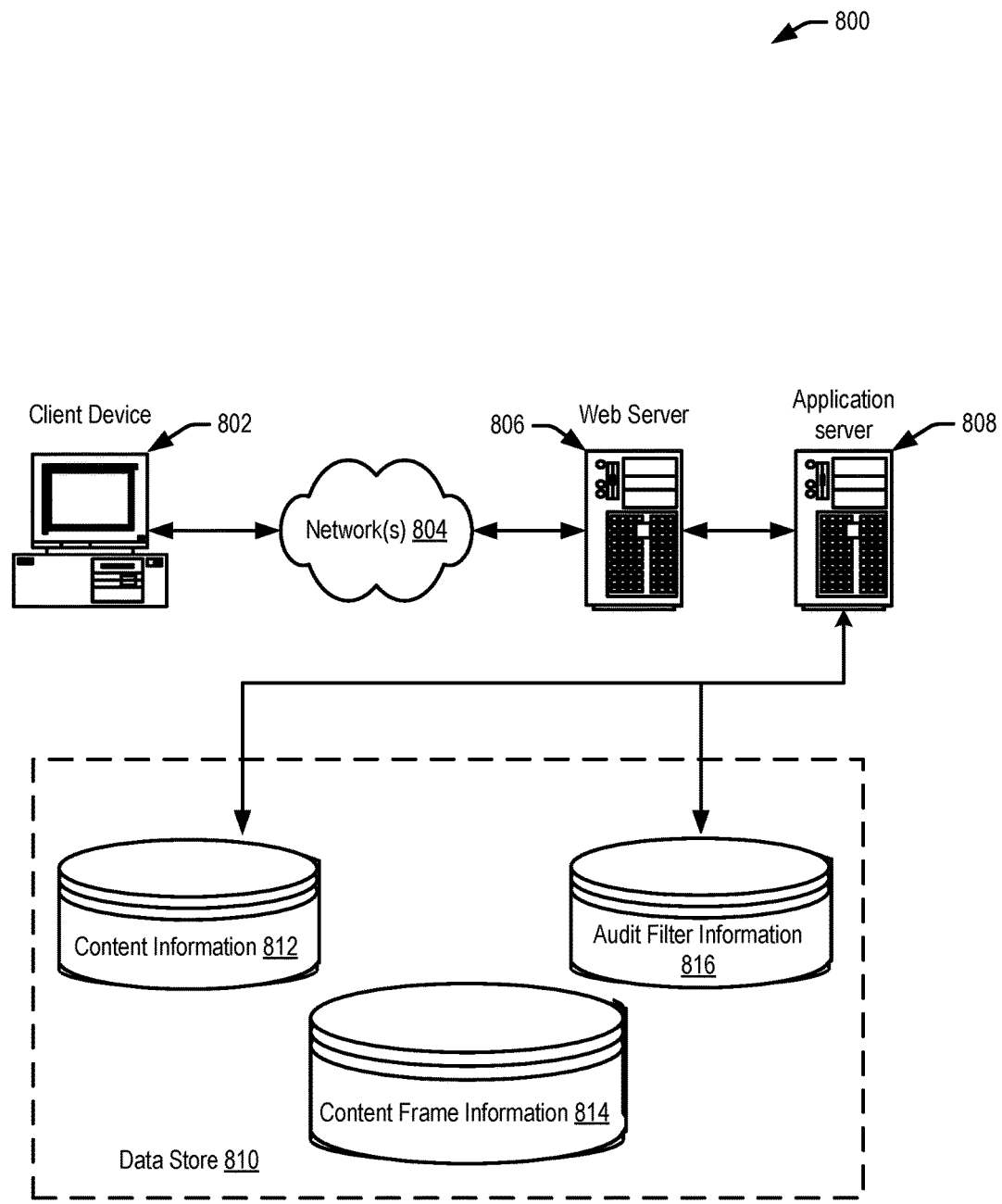
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content information 812 and audit filter information 816, which can be used to serve content for the production side. The data store also is shown to include a mechanism for storing content frame information 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
maintaining, by a computer system, content information for a plurality of videos that identifies at least one of cast or crew associated with each video;
receiving, by the computer system, a request to identify particular content information and an identity associated with a particular video of the plurality of videos;
determining, by the computer system, a time period within the particular video that is associated with presentation of credit information for the particular video based at least in part on metadata associated with the particular video;
identifying, utilizing optical character recognition, a plurality of words in the credit information of the particular video based at least in part on the time period;
determining, by the computer system, the particular content information associated with the particular video based at least in part on the plurality of words in the credit information of the particular video and the content information for the plurality of videos;
selecting, by the computer system, a set of rules that are utilized to identify errors in the particular content information of the particular video, the set of rules comprising at least a first rule using a first location of a particular word of the plurality of words in a first frame of a segment of the particular video and a second location for the particular word in a second frame of the segment of the particular media work to identify the errors, and a second rule using a statistical operation associated with a word count of the particular word in the segment and a threshold;

updating, by the computer system, a user interface that is configured to present, via a corresponding user device, the errors identified for the particular word in the particular content information of the particular video based at least in part on applying the set of rules to the particular content information, the user interface including one or more words, including the particular word, grouped in a first configuration;

receiving, by the computer system, input from the user interface of the corresponding user device that identifies movement of the particular word to a new location on the user interface, the new location usable to associate the particular word with at least one of a specific cast or crew associated with the particular video, the one or more words grouped in a second configuration based at least in part on the input and the association;

updating, by the computer system, the content information for the plurality of videos based at least in part on the input for the particular content information of the particular video; and determining, by the computer system, the identity of the particular video based at least in part on a comparison of a classification of entities included in the particular content information of the particular video and the classification of entities included in associated content information from a set of videos of the plurality of videos.

2. The computer-implemented method of claim 1, wherein identifying the plurality of words in the credit information of the particular video includes performing the optical character recognition for each frame in a portion of the particular video.

3. The computer-implemented method of claim 2, wherein identifying the plurality of words in the credit information of the particular video includes obtaining a count of each word in the credit information.

4. The computer-implemented method of claim 3, further comprising filtering, by the computer system, the plurality of words in the credit information of the particular video based at least in part on a comparison of an average count of a particular word of the plurality of words to each occurrence of the particular word in the credit information, the average count of the particular word determined based on the obtained count of each word in the credit information.

5. The computer-implemented method of claim 1, wherein identifying the plurality of words in the credit information of the particular video includes identifying position information for the plurality of words, utilizing the optical character recognition, in each frame in a portion of the particular video.

6. A system comprising:
a processor; and
a memory including instructions that, when executed by the processor, cause the system to, at least:
maintain content information for a plurality of media works that identifies entities associated with each media work;
receive a request to identify an identity of a particular media work of the plurality of media works using particular content information associated with the particular media work;
identify one or more words included in a segment of the particular media work, the segment configured to be presented as credit information for the particular media work;
filter the one or more words identified in the particular content information associated with the particular media work based at least in part on a set of rules to identify errors included in the one or more words, the set of rules comprising at least a first rule using a first location of a particular word of the one or more words in a first frame of the segment of the particular media work and a second location for the particular word in a second frame of the segment of the particular media work to filter the one or more words, and a second rule using a statistical operation associated with a word count of the particular word in the segment and a threshold;
update a user interface that is configured to present, via a corresponding user device, the filtered one or more words for the particular media work that identify the errors for the segment of the particular media work based at least in part on applying the set of rules to the one or more words, the user interface including a first configuration of the filtered one or more words;
receive input from the user interface of the corresponding user device that identifies movement of the particular word to a new location on the user interface, the new location usable to associate the particular word with a new entity of the entities associated with the particular media work, the one or more words, including the particular word, updated to a second configuration based at least in part on the input and the association;
update the content information for the plurality of media works based at least in part on the input for the particular media work; and
determine the identity of the particular media work based at least in part on a comparison of a classification of entities included in the particular content information of the particular media work and the classification of entities included in the updated content information for the plurality of media works.

7. The system of claim 6, wherein the threshold is associated with one or more classifications of the entities associated with the particular media work.

8. The system of claim 6, wherein identifying the one or more words included in the segment of the particular media work comprises performing optical character recognition on each frame of the segment of the particular media work, the optical character recognition identifying coordinates in each frame of the segment of the particular media work of each word of the one or more words.

9. The system of claim 6, wherein the content information for the plurality of media works further identifies at least one of trivia associated with each media work, music soundtrack data associated with each media work, information indicating order of billing, or redirect links to other information associated with each media work.

10. The system of claim 6, wherein the instructions when executed by the processor further cause the system to at least update the content information for one or more portions of the particular media work based at least in part on the filtered one or more words identified in the particular media work.

11. A non-transitory computer-readable storage medium having stored thereon computer-executable instructions that, when executed by one or more processors of a computer system, cause the computer system to perform operations comprising:

maintaining content information for a plurality of media works;

in response to receiving, from a requesting entity, a particular media work:

identifying one or more words included in a segment of the particular media work based at least in part on performing optical character recognition on the segment of the particular media work, the segment configured to be presented in the particular media work as credit information for the particular media work;

filtering the identified one or more words included in the segment of the particular media work based at least in part on a set of rules that identify errors included in the one or more words, a first rule of the set of rules comprising a first location of a particular word of the one or more words in a first frame of the segment of the particular media work and a second location for the particular word in a second frame of the segment of the particular media work to filter the one or more words, a second rule of the set of rules comprising a statistical operation associated with a word count of the particular word in the segment and a threshold;

updating a user interface that is configured to present, via a corresponding user device, the filtered one or more words for the particular media work that identify the errors for the segment of the particular media work to the requesting entity based at least in part on applying the set of rules to the one or more words, the user interface including a first configuration of the filtered one or more words;

receiving input from the requesting entity, via the user interface of the corresponding user device, that identifies movement of the particular word to a new location on the user interface, the new location usable to associate the particular word with a new entity of entities associated with the particular media work, the filtered one or more words, including the particular word, updated to a second configuration based at least in part on the input and the association;

generating the content information for the particular media work utilizing the input for the one or more words included in the segment of the particular media work; and determine an identity of the particular media work based at least in part on a comparison of a classification of entities included in the one or more words of the segment of the particular media work and the classification of entities included in the content information for the plurality of media works.

12. The non-transitory computer-readable storage medium of claim 11, wherein the user interface is configured to enable a user to search for the particular word included in the filtered one or more words for the particular media work.

13. The non-transitory computer-readable storage medium of claim 11, wherein the user interface is configured to transmit, to the computer system, input for tagging the particular word in a frame of the segment of the particular media work based at least in part on the content information.

14. The non-transitory computer-readable storage medium of claim 13, wherein the user interface is further configured to enable a user to update the content information for the particular media work by associating the particular word of the filtered one or more words to the classification of entities associated with the particular media work.

15. The non-transitory computer-readable storage medium of claim 11, wherein the set of rules further comprise a third rule for removing the particular word from the one or more words based on a number of words between a first occurrence of the particular word in a frame of the segment of the particular media work and a second occurrence of the particular word in the frame exceeding the threshold.

16. The non-transitory computer-readable storage medium of claim 11, wherein the set of rules further comprise a third rule for associating a first word of the one or more words with a second word of the one or more words based at least in part on presence of the first word and the second word in a frame of the segment of the particular media work.

* * * * *